(12) United States Patent
Takeshita et al.

(10) Patent No.: US 11,643,165 B2
(45) Date of Patent: May 9, 2023

(54) BICYCLE DRIVE SYSTEM, BICYCLE DRIVE UNIT, AND BICYCLE BATTERY UNIT

(71) Applicant: Shimano Inc., Osaka (JP)

(72) Inventors: Hiroaki Takeshita, Osaka (JP); Tetsuya Kitani, Osaka (JP)

(73) Assignee: Shimano Inc., Osaka (JP)

( * ) Notice: Subject to any disclaimer, the term of this patent is extended or adjusted under 35 U.S.C. 154(b) by 127 days.

(21) Appl. No.: 16/944,710

(22) Filed: Jul. 31, 2020

(65) Prior Publication Data

US 2020/0361563 A1 Nov. 19, 2020

Related U.S. Application Data

(62) Division of application No. 15/919,730, filed on Mar. 13, 2018, now Pat. No. 10,773,769.

(30) Foreign Application Priority Data

Apr. 3, 2017 (JP) .............................. JP2017-073964
Sep. 27, 2017 (JP) .............................. JP2017-187057

(51) Int. Cl.
*B62M 6/45* (2010.01)
*B62M 6/55* (2010.01)
*B62J 45/20* (2020.01)
*B62M 6/90* (2010.01)
*B62J 43/13* (2020.01)

(52) U.S. Cl.
CPC ................ *B62M 6/45* (2013.01); *B62J 43/13* (2020.02); *B62M 6/55* (2013.01); *B62M 6/90* (2013.01); *B62J 45/20* (2020.02)

(58) Field of Classification Search
CPC . B62J 43/13; B62J 45/20; B62M 6/55; B62M 6/45; B62M 6/90
USPC ......................................................... 180/220
See application file for complete search history.

(56) References Cited

U.S. PATENT DOCUMENTS

| | | |
|---|---|---|
| 4,527,648 A | 7/1985 | Sines et al. |
| 5,237,263 A | 8/1993 | Gannon |
| 5,613,569 A | 3/1997 | Sugioka et al. |

(Continued)

FOREIGN PATENT DOCUMENTS

| | | |
|---|---|---|
| CN | 104210607 A | 12/2014 |
| DE | 20 2014 005 762 U1 | 11/2014 |

(Continued)

*Primary Examiner* — Kevin Hurley
*Assistant Examiner* — Felicia L. Brittman
(74) *Attorney, Agent, or Firm* — Global IP Counselors, LLP

(57) ABSTRACT

A bicycle drive unit includes a motor, a second electronic controller and a communication circuit. The motor is configured to assist in propulsion of a bicycle. The second electronic controller controls the motor. The communication circuit is configured to communicate with an operation device that operates a bicycle electric component. The second electronic controller is operable in a third state, in which the motor is drivable, and a fourth state, which consumes less power than the third state and does not drive the motor. The second electronic controller is configured to switch an operation state from the fourth state to the third state upon the communication circuit receiving an input signal while the second electronic controller is operated in the fourth state.

9 Claims, 6 Drawing Sheets

(56) References Cited

U.S. PATENT DOCUMENTS

| | | | |
|---|---|---|---|
| 2015/0352973 A1* | 12/2015 | Gao | B60L 1/003 |
| | | | 318/139 |
| 2016/0250937 A1 | 9/2016 | Hayslett et al. | |
| 2017/0297652 A1 | 10/2017 | Yoshiie et al. | |
| 2019/0228466 A1* | 7/2019 | Kojima | G08G 1/123 |

FOREIGN PATENT DOCUMENTS

| | | |
|---|---|---|
| JP | 8-37706 A | 2/1996 |
| JP | 3495758 B2 | 2/2004 |
| JP | 2011-230665 A | 11/2011 |
| JP | 2012-166616 A | 9/2012 |
| JP | 2014-144699 A | 8/2014 |
| JP | 2015-231764 A | 12/2015 |

* cited by examiner

BICYCLE DRIVE SYSTEM, BICYCLE DRIVE UNIT, AND BICYCLE BATTERY UNIT

CROSS-REFERENCE TO RELATED APPLICATIONS

This application is a divisional application of U.S. patent application Ser. No. 15/919,730, filed on Mar. 13, 2018. This application also claims priority to Japanese Patent Application No. 2017-073964, filed on Apr. 3, 2017 and Japanese Patent Application No. 2017-187057, filed on Sep. 27, 2017. The entire disclosures of U.S. patent application Ser. No. 15/919,730, and Japanese Patent Application Nos. 2017-073964 and 2017-187057 are hereby incorporated herein by reference.

BACKGROUND

Field of the Invention

The present invention generally relates to a bicycle drive system, a bicycle drive unit, and a bicycle battery unit.

Background Information

Some bicycles are provided with a bicycle drive system that assists in propulsion of the bicycle. For example, Japanese Laid-Open Patent Publication No. 2011-230665 describes one example of a conventional bicycle drive system that assists in propulsion of a bicycle. In the bicycle drive system of this patent publication, a battery and a control device for driving a motor are connected by a single power supply path. Operation of a power switch changes the bicycle drive system to a mode in which the motor assists in propulsion of the bicycle.

SUMMARY

One object of the present invention to provide a bicycle drive system, a bicycle drive unit, and a bicycle battery unit that contribute to increases in convenience.

A first aspect of the present invention is a bicycle drive unit that includes a motor configured to assist in propulsion of a bicycle, a second electronic controller that controls the motor, and a communication circuit configured to communicate with an operation device that operates a bicycle electric component. The second electronic controller is operable in a third state, in which the motor is drivable, and a fourth state, which consumes less power than the third state and does not drive the motor. The second electronic controller is configured to switch an operation state from the fourth state to the third state upon the communication circuit receiving an input signal while the second electronic controller is operated in the fourth state. With the bicycle drive unit according to the first aspect, the reception of the input signal allows the bicycle drive unit to be switched from the fourth state to the third state. This increases the convenience. If the user moves an operation device that operates the bicycle electric component, the bicycle drive unit is set to a state in which propulsion of the bicycle can be assisted.

In accordance with a second aspect of the present invention, the bicycle drive unit according to the fourth aspect is configured so that the bicycle electric component includes at least one of a shifting device, a suspension and a seatpost. With the bicycle drive unit according to the second aspect, if the user moves at least one of the shifting device, the suspension, and the seatpost, the bicycle drive unit is set to a state in which propulsion of the bicycle can be assisted.

In accordance with a third aspect of the present invention, the bicycle drive unit according to the first or second aspect is configured so the second electronic controller is activated by electric power supplied from at least one of a first electric power supply path and a second electric power supply path. With the bicycle drive unit according to the third aspect, the second electronic controller can be preferably activated by the power supplied from at least one of the first electric power supply path and the second electric power supply path.

In accordance with a fourth aspect of the present invention, the bicycle drive unit according to the third aspect is configured so that a second voltage converter is connected to the first electric power supply path to convert a voltage of power supplied through the first electric power supply path, and a third voltage converter is connected to the second electric power supply path to convert a voltage of power supplied through the second electric power supply path. With the bicycle drive unit according to the fourth aspect, the power supplied through the first and second electric power supply paths is converted into a voltage suitable for the bicycle drive unit.

In accordance with a fifth aspect of the present invention, the bicycle drive unit according to the fourth aspect is configured so that an output voltage of the second voltage converter is substantially equal to an output voltage of the third voltage converter. With the bicycle drive unit according to the fifth aspect, the bicycle electric component can be operated with power supplied from the first or second electric power supply path.

In accordance with a sixth aspect of the present invention, the bicycle drive unit according to the fifth aspect is configured so that a fifth voltage converter is electrically connected to the second voltage converter and to the communication circuit. The fifth voltage converter is configured to convert the output voltage of the second voltage converter and to supply the converted output voltage to the communication circuit. With the bicycle drive unit according to the sixth aspect, the power supplied through the fifth voltage converter is converted into a voltage suitable for the second electronic controller of the bicycle drive unit.

A seventh aspect of the present invention is a bicycle drive unit that includes a motor configured to assist in propulsion of a bicycle, a second electronic controller that controls the motor; and a communication circuit configured to wirelessly communicate with an external device. The second electronic controller is operable in a third state, in which the motor is drivable, and a fourth state, which consumes less power than the third state and does not drive the motor. The second electronic controller is configured to switch an operation state from the fourth state to the third state upon the communication circuit receiving an input signal while the second electronic controller is operated in the fourth state. With the bicycle drive unit according to the seventh aspect, the reception of the input signal allows the bicycle drive unit to be switched from the fourth state to the third state. This increases the convenience. If the user moves an operation device that operates the bicycle electric component, the bicycle drive unit is set to a state in which propulsion of the bicycle can be assisted.

In accordance with an eighth aspect of the present invention, the bicycle drive unit according to the seventh aspect is configured so that the external device includes a smart phone, a tablet PC, a cycle computer or a personal computer. With the bicycle drive unit according to the eighth aspect, the user can wirelessly control the second electronic controller, thereby increasing the convenience.

In accordance with a ninth aspect of the present invention, the bicycle drive unit according to the seventh aspect is configured so that at least one of a setting and a software of the bicycle drive unit is updated based on information transmitted by the external device. With the bicycle drive unit according to the ninth aspect, at least one of the setting and the software of the bicycle drive unit can be updated, thereby improving convenience.

The bicycle drive system, the bicycle drive unit, and the bicycle battery unit of the present invention contribute to increases in convenience.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
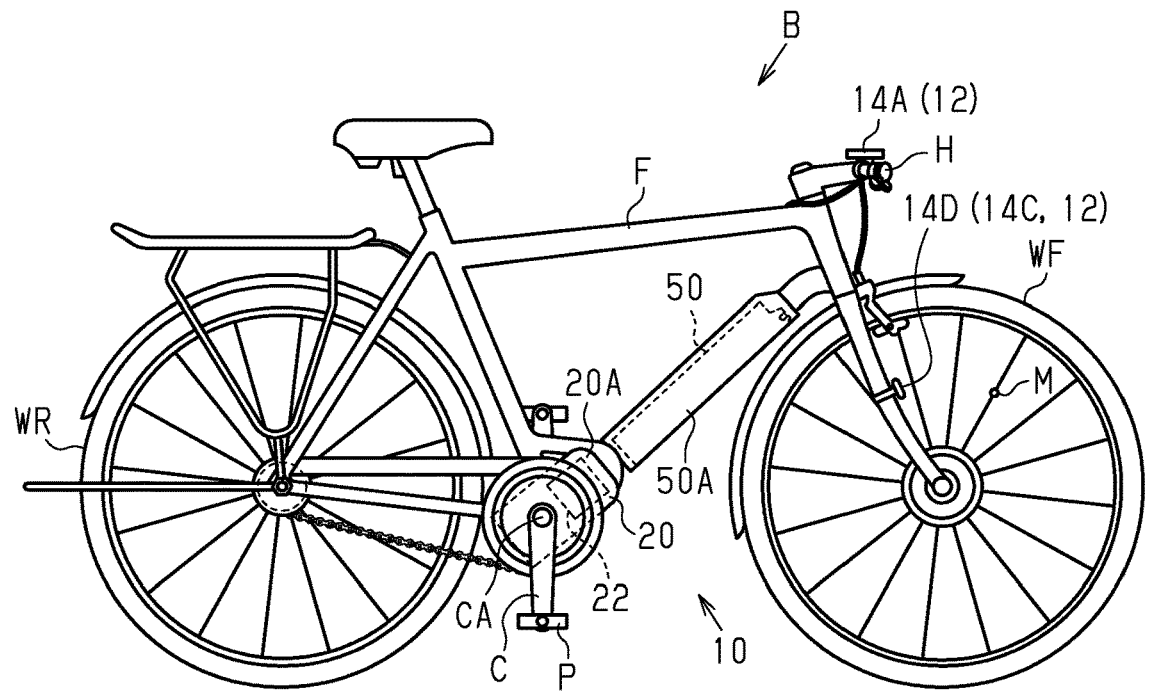
FIG. 1 is a side elevational view of a bicycle including a bicycle drive system in accordance with a first embodiment.
Figure 2:
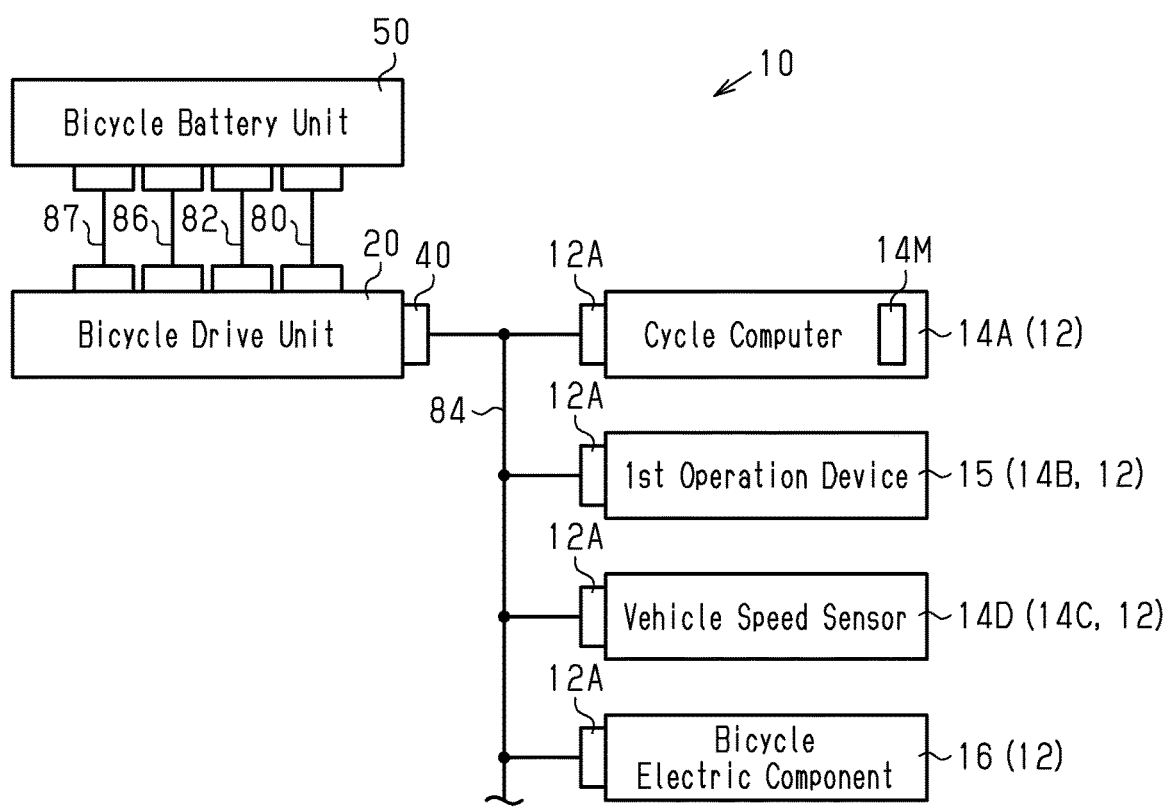
FIG. 2 is a block diagram showing an electrical configuration of the bicycle drive system of FIG. 1.

A first embodiment of a bicycle drive system 10 will now be described with reference to FIGS. 1 to 4. As shown in FIG. 1, a bicycle B includes the bicycle drive system 10. As shown in FIG. 2, the bicycle drive system 10 includes a bicycle drive unit 20 and a bicycle battery unit 50. The bicycle drive system 10 further includes a plurality of bicycle components 12. The bicycle drive system 10 further includes a display 14M. In the description hereafter, the bicycle drive unit 20 is referred to as the drive unit 20. In the description hereafter, the bicycle battery unit 50 is referred to as the battery unit 50.

The bicycle components 12 include at least one of a cycle computer 14A, an operation device 14B and a sensor 14C. The cycle computer 14A, the operation device 14B and the sensor 14C are provided on the bicycle B. The operation device 14B is configured to operate another one of the bicycle component 12. The bicycle components 12 further include a bicycle electric component 16. At least some of the bicycle components 12 use power supplied via the drive unit 20.

The cycle computer 14A includes the display 14M. The display 14M is configured to show information related to the bicycle B. The cycle computer 14A is coupled to a handlebar H of the bicycle B. The cycle computer 14A is configured to communicate with a second electronic controller 24 of the drive unit 20. In the description hereafter, the second electronic controller 24 is referred to as the second controller 24. The cycle computer 14A is connected to the second controller 24 through wired communications. The cycle computer 14A is configured to communicate with a first electronic controller 56 of the battery unit 50, for example, through power line communication (PLC). In the description hereafter, the first electronic controller 56 is referred to as the first controller 56. The cycle computer 14A shows information received from at least one of another one of the bicycle component 12 and the drive unit 20 on the display 14M. The cycle computer 14A includes a communication device (not shown), which outputs signals and receives signals from an external device.

The cycle computer 14A can include a wireless communication device so as to perform wireless communications with the drive unit 20. In a case where the drive unit 20 performs wireless communications with the cycle computer 14A, the drive unit 20 includes a wireless communication device. In this case, it is desirable that the cycle computer 14A include a battery.

The operation device 14B is configured to be operable by the rider. The operation device 14B includes a sensor (not shown), which detects movement of an operation portion provided on the operation device 14B, and a communication device (not shown), which transmits signals to a communication circuit or device 32 of the drive unit 20 and the bicycle electric component 16 in accordance with output signals from the sensor.

The operation device 14B includes a first operation device 15 that operates the bicycle electric component 16. The first operation device 15 is coupled to the handlebar H of the bicycle B. The first operation device 15 is configured to communicate with the second controller 24 of the drive unit 20. The first operation device 15 is connected to the second controller 24 through wired communication. The first operation device 15 is configured to communicate with the second controller 24 through power line communication. The first operation device 15 is connected to the bicycle electric component 16 through wired communication. The first operation device 15 is configured to communicate with the bicycle electric component 16 through power line communication. In a case where the rider operates the first operation device 15, the first operation device 15 transmits an output signal to the bicycle electric component 16 and the communication circuit 32 of the drive unit 20. The second controller 24 controls operation of the bicycle electric component 16. In a case where the communication circuit 32 receives the output signal from the first operation device 15, if the bicycle electric component 16 is allowed to be operated in accordance with a predetermined control program, the second controller 24 has the communication circuit 32 transmit an operation instruction to the bicycle electric component 16. If the bicycle electric component 16 receives the operation instruction from the communication circuit 32, the bicycle electric component 16 operates. The communication circuit 32 functions as a master communication circuit for carrying out power line communication. Thus, the communication circuit 32 can be referred to as a power line communication circuit or a master power line communication circuit.

The operation device 14B can further include a second operation device that operates the drive unit 20. The second operation device is coupled to the handlebar H of the bicycle B. The second operation device is configured to communicate with the second controller 24 of the drive unit 20. The second operation device is connected to the second controller 24 through wired communication. The second operation device is configured to communicate with the second controller 24 through power line communication. The operation device 14B can be operated, for example, to change multiple operation modes of the drive unit 20. The multiple operation modes of the drive unit 20 include, for example, multiple assist modes producing different assist forces and an OFF mode that stops the assisting.

The sensor 14C includes a vehicle speed sensor 14D. The sensor 14C is configured to communicate with the second controller 24 of the drive unit 20, for example, through power line communication. The sensor 14C transmits output signals to the second controller 24. The sensor 14C includes a communication device (not shown) that transmits signals to the communication circuit 32. The vehicle speed sensor 14D can be connected to the second controller 24 by a normal communication line, instead of through power line communication, so as to be configured to communicate with the second controller 24. The vehicle speed sensor 14D can be configured to communicate with the second controller 24 through wireless communication instead of power line communication.

The vehicle speed sensor 14D detects the rotation speed of a wheel. As shown in FIG. 1, the vehicle speed sensor 14D is attached to a front fork of a frame F. The vehicle speed sensor 14D transmits signals to the second controller 24 in correspondence with changes in the relative position of a magnet M attached to the wheel and the vehicle speed sensor 14D. It is preferred that the vehicle speed sensor 14D include a magnetic reed forming a reed switch or a Hall element. The vehicle speed sensor 14D can be attached to a chainstay of the frame F.

The bicycle electric component 16 shown in FIG. 2 includes at least one of a shifting device, a suspension, and a seatpost. The shifting device includes an actuator that changes the transmission ratio of the bicycle B. The suspension includes an actuator that changes at least one of the hardness, the damping ratio, and the height of the suspension of the bicycle B. The seatpost includes an actuator that changes the height of the seatpost of the bicycle B. The actuator of the seatpost can control the valve of a seatpost that is extended by hydraulic pressure or air. The bicycle electric component 16 includes a communication device (not shown) that receives signals from the first operation device 15 and signals from the communication circuit 32. The shifting device includes at least one of a front derailleur, a rear derailleur, and an internal shifting device. The suspension includes at least one of a front suspension and a rear suspension. In a case where the bicycle electric component 16 includes the shifting device, the operation device 14B includes a shift operation device. In a case where the bicycle electric component 16 includes the suspension, the operation device 14B includes a suspension operation device. In a case where the bicycle electric component 16 includes the seatpost, the operation device 14B includes a seatpost operation device. Each actuator includes an electric motor and preferably further includes a reduction gear that reduces the speed of rotation of the electric motor.

Figure 3:
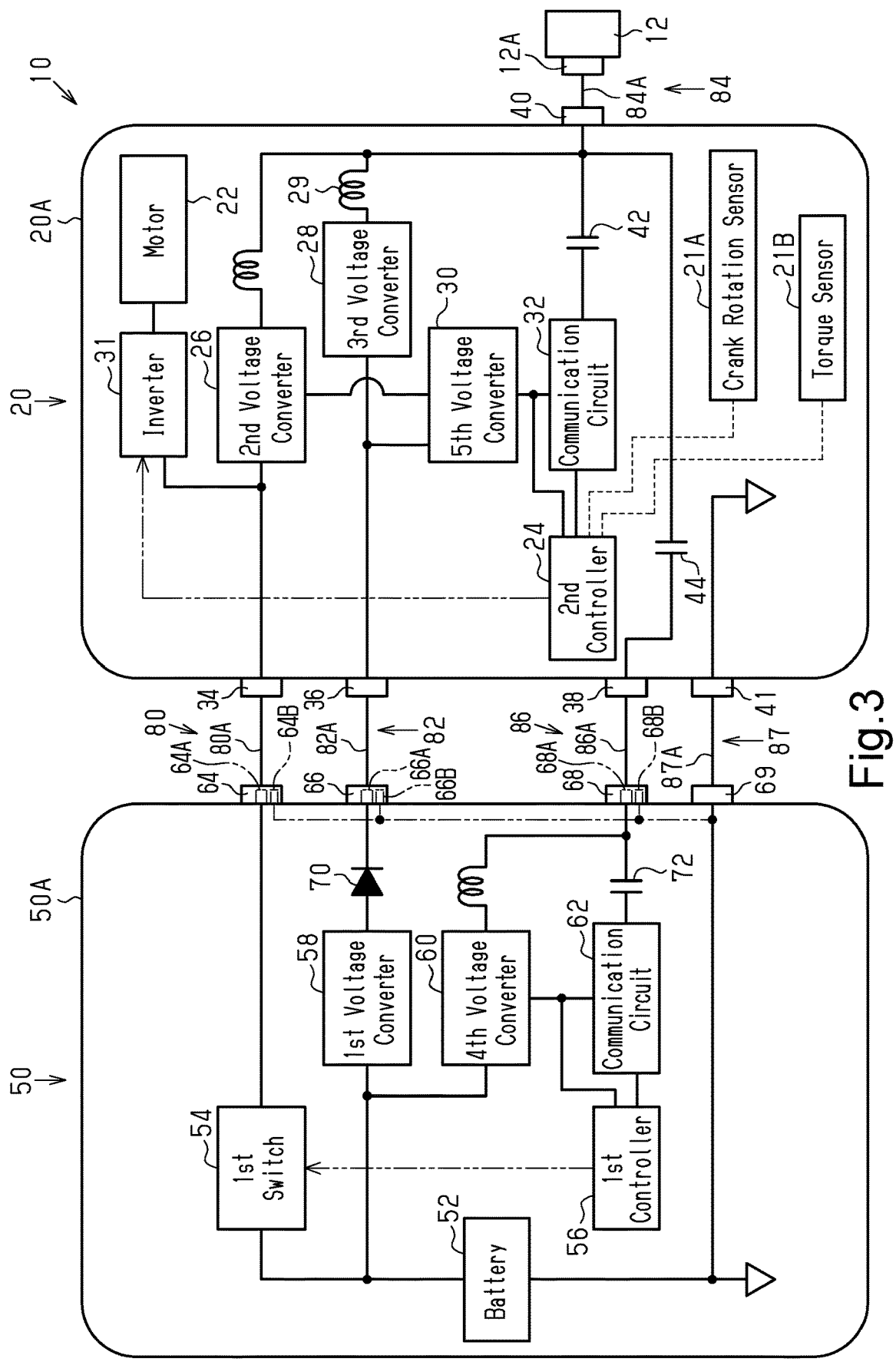
FIG. 3 is a block diagram showing an electrical configuration of a bicycle drive unit and a bicycle battery unit of the bicycle drive system shown in FIG. 2.

As shown in FIGS. 1 and 3, the drive unit 20 includes a motor 22 configured to assist in propulsion of the bicycle. The motor 22 includes an electric motor. The drive unit 20 is provided in a human driving force transmission path extending from pedals P to a rear wheel WR or on a front wheel WF to transmit rotation. The drive unit 20 is provided on the frame F, the rear wheel WR, or the front wheel WF of the bicycle B. In one example, the drive unit 20 is connected to a driving force transmission path extending from a crankshaft CA to a front rotary body. In this case, the drive unit 20 can be configured to include a member forming the driving force transmission path, which extends from the crankshaft CA to the front rotary body.

In one example, the drive unit 20 includes the second controller 24, the communication circuit 32, a first electrical connector 34, a second electrical connector 36, a third electrical connector 38, and a seventh electrical connector 40. It is preferred that the drive unit 20 further include a second voltage converter 26, a third voltage converter 28, and a fifth voltage converter 30. The drive unit 20 further includes an eighth electrical connector 41.

The second controller 24 and the communication circuit 32 can be configured to include separate microcomputers, share a single microcomputer, or each include a plurality of microcomputers. A microcomputer includes a central processing unit (CPU) and a memory that stores predetermined programs. In any case, the second controller 24 is provided with at least one processor. The memory is any computer storage device or any computer readable medium with the sole exception of a transitory, propagating signal.

The motor 22, the second controller 24, the second voltage converter 26, the third voltage converter 28, the fifth voltage converter 30, and the communication circuit 32 are accommodated in a housing 20A of the drive unit 20. The second controller 24, the communication circuit 32, the second voltage converter 26, the third voltage converter 28, and the fifth voltage converter 30 are mounted on one or multiple circuit boards. Although FIG. 3 separately shows the second controller 24 and the communication circuit 32, the second controller 24 can include the communication circuit 32. The eighth electrical connector 41 is electrically connected to ground of a circuit board provided on the drive unit 20.

The first electrical connector 34, the second electrical connector 36, the third electrical connector 38, the seventh electrical connector 40, and the eighth electrical connector 41 are provided in the housing 20A so as to be at least partially exposed out of the housing 20A of the drive unit 20. At least one of the first electrical connector 34, the second electrical connector 36, the third electrical connector 38, the seventh electrical connector 40, and the eighth electrical connector 41 can be entirely accommodated in the housing 20A of the drive unit 20. The drive unit 20 can be provided with a structure other than the motor 22. For example, a reduction gear can be provided on the drive unit 20 to reduce the speed of rotation of the motor 22 and output the rotation. The motor 22 is driven by power supplied via a first power supply path 80. It is preferred that an input electrical connector of the motor 22 be connected to the first electrical connector 34 via an inverter 31. The inverter 31 is controlled by the second controller 24.

It is preferred that the drive unit 20 be further provided with at least one of a crank rotation sensor 21A, which detects rotation of a crank C (refer to FIG. 1), and a torque sensor 21B, which detects human driving force that is input to the bicycle B (refer to FIG. 1). The crank rotation sensor 21A is configured to transmit signals to the second controller 24 in accordance with rotation of the crank C. The torque sensor 21B is configured to transmit signals to the second controller 24 in accordance with manual driving force input to the crank C. The crank rotation sensor 21A and the torque sensor 21B are connected to the second controller 24 through wired or wireless communication. The crank rotation sensor 21A and the torque sensor 21B can be supplied with power from the second controller 24 or from at least one of the second voltage converter 26, the fifth voltage converter 30, and the third voltage converter 28. At least one of the crank rotation sensor 21A and the torque sensor 21B can be provided separately from the drive unit 20. The crank rotation sensor 21A and the torque sensor 21B that are provided separately from the drive unit 20 can be included in the sensor 14C and the bicycle components 12.

The drive unit 20 can be configured to omit the second voltage converter 26 or the third voltage converter 28. In a case where the second voltage converter 26 is omitted, the first electrical connector 34 is not electrically connected to the seventh electrical connector 40. The second controller 24 and the communication circuit 32 are constantly supplied with power from the battery unit 50 via a second power supply path 82. In a case where the third voltage converter 28 is omitted, the second electrical connector 36 is connected to an inductor 29.

The battery unit 50 includes a battery 52, a first switch 54 and the first controller 56. While the battery 52 is illustrated as an example of an electrical power source in FIG. 3, the battery unit 50 can be provided with alternative types of electrical power sources such as a capacitor, a fuel cell, etc. In one example, the battery unit 50 includes a first voltage converter 58, a fourth voltage converter 60, a communication circuit 62, a fourth electrical connector 64, a fifth electrical connector 66, and a sixth electrical connector 68. The battery unit 50 further includes a ninth electrical connector 69. The fourth electrical connector 64, the fifth electrical connector 66, and the sixth electrical connector 68 include positive terminals 64A, 66A and 68A, respectively.

The battery 52, the first switch 54, the first controller 56, the first voltage converter 58, the fourth voltage converter 60 and the communication circuit 62 are accommodated in a housing 50A of the battery unit 50. The first switch 54, the first voltage converter 58, the first controller 56, the fourth voltage converter 60, the communication circuit 62, a diode 70, and a capacitor 72 are mounted on one or multiple circuit boards. Although FIG. 3 separately shows the first controller 56 and the communication circuit 62, the first controller 56 can include the communication circuit 62. The ninth electrical connector 69 is electrically connected to ground of the circuit board. The ninth electrical connector 69 includes a ground terminal.

The fourth electrical connector 64, the fifth electrical connector 66, the sixth electrical connector 68, and the ninth electrical connector 69 are provided in the housing 50A so as to be at least partially exposed out of the housing 50A of the battery unit 50. At least one of the fourth electrical connector 64, the fifth electrical connector 66, the sixth electrical connector 68 and the ninth electrical connector 69 can be entirely accommodated in the housing 50A of the battery unit 50. The battery 52 includes a plurality of battery cells.

The first controller 56 and the communication circuit 62 can be configured to include separate microcomputers, share a single microcomputer, or each include a plurality of microcomputers. A microcomputer includes a CPU and a memory that stores predetermined programs. In any case, the first controller 56 is provided with at least one processor. The memory is any computer storage device or any computer readable medium with the sole exception of a transitory, propagating signal.

Each of the drive unit 20 and the battery unit 50 includes at least a portion of the first power supply path 80 and at least a portion of the second power supply path 82. In one example, the drive unit 20 and the battery unit 50 further include at least a portion of a third power supply path 84 and at least a portion of a communication path 86.

The first power supply path 80 supplies power from the battery unit 50 to the drive unit 20. The first power supply path 80 includes the first electrical connector 34, the fourth electrical connector 64, and a first electrical conductor 80A electrically connecting the first electrical connector 34 and the fourth electrical connector 64. The fourth electrical connector 64 is configured to supply power to the bicycle drive unit 20. The first electrical connector 34 is supplied with power from the battery unit 50.

The second power supply path 82 supplies the drive unit 20 with power from the battery unit 50 that is smaller than the power supplied via the first power supply path 80. The second power supply path 82 includes the second electrical connector 36, the fifth electrical connector 66, and a second electrical conductor 82A electrically connecting the second electrical connector 36 and the fifth electrical connector 66. The second electrical connector 36 is supplied with power from the battery unit 50. The fifth electrical connector 66 is configured to supply the drive unit 20 with smaller power than the fourth electrical connector 64. The first electrical connector 34 is configured to be supplied with power from the battery unit 50 that is larger than the power supplied via the second electrical connector 36.

The communication path 86 is configured to perform communication between the battery unit 50 and the drive unit 20. The communication path 86 includes the third electrical connector 38, the sixth electrical connector 68, and a fourth electrical conductor 86A electrically connecting the third electrical connector 38 and the sixth electrical connector 68. The communication path 86 carries signals that are output from the communication circuit 62 of the battery unit 50, the communication circuit 32 of the drive unit 20, and the bicycle components 12. The third electrical connector 38 is electrically connected to the battery unit 50. The third power supply path 84 is electrically connected to the communication path 86. The communication path 86 is configured to be a power supply path that supplies power to the third power supply path 84. Power line communication is performed through the communication path 86.

The drive unit 20 and the battery unit 50 further include at least a portion of a ground path 87. The ground path 87 includes the eighth electrical connector 41, the ninth electrical connector 69, and a fifth electrical conductor 87A electrically connecting the eighth electrical connector 41 and the ninth electrical connector 69.

At least one of the first electrical conductor 80A, the second electrical conductor 82A, the fourth electrical conductor 86A, and the fifth electrical conductor 87A can be configured to include an electric plug and an electric cable. The electric plug can include at least one of a first electric plug connected to the battery unit 50 and a second electric plug connected to the drive unit 20. In a case where the first electric plugs of the electrical conductors 80A, 82A, 86A and 87A are connected to the fourth electrical connector 64, the fifth electrical connector 66, the sixth electrical connector 68, and the ninth electrical connector 69, it is preferred that one of the first electric plugs be provided with a plurality of terminals separately connected to the electrical connectors 64, 66, 68 and 69 and that the first electric plug be configured to be attachable to and removable from the battery unit 50. In a case where the second electric plugs are connected to the first electrical connector 34, the second electrical connector 36, the third electrical connector 38, and the eighth electrical connector 41, it is preferred that one of the second electric plugs be provided with a plurality of terminals separately connected to the electrical connectors 34, 36, 38 and 41, and that the second electric plug be configured to be attachable to and removable from the drive unit 20. Four first electric plugs can be provided so as to be separately connected to the electrical connectors 64, 66, 68 and 69. Alternatively, two or three first electric plugs can be provided so that each first electric plug is provided with one or more terminals separately connected to one or more of the electrical connectors 64, 66, 68 and 69. Four second electric plugs can be provided so as to be separately connected to the electrical connectors 34, 36, 38 and 41. Alternatively, two or three second electric plugs can be provided so that each second electric plug includes one or more terminals separately connected to one or more of the electrical connectors 34, 36, 38 and 41.

In a case where the first electrical conductor 80A, the second electrical conductor 82A, the fourth electrical conductor 86A and the fifth electrical conductor 87A include an electric cable, it is preferred that the electric cable be configured by a single electric cable having multiple cores. Additionally, the electric cable of the first electrical conductor 80A, the second electrical conductor 82A, the fourth electrical conductor 86A, and the fifth electrical conductor 87A can be formed by separate cables. Alternatively, any number of a plurality of electric cables of the first electrical conductor 80A, the second electrical conductor 82A, the fourth electrical conductor 86A, and the fifth electrical conductor 87A can be configured to be a single electric cable having multiple cores.

The first electrical conductor 80A, the second electrical conductor 82A, the fourth electrical conductor 86A, and the fifth electrical conductor 87A can include a battery holder holding the battery unit 50. The battery holder includes battery electrical connectors separately connected to the electrical connectors 64, 66, 68 and 69. The battery electrical connectors are connected to the electrical connectors 34, 36, 38 and 41 via the electric cables.

In a case where the electrical conductors 80A, 82A, 86A and 87A are omitted from the paths 80, 82, 84, 86 and 87, the electrical connectors 34, 36, 38 and 41 can be configured to be directly connected to the electrical connectors 64, 66, 68 and 69 corresponding to the electrical connectors 34, 36, 38 and 41. In a case where the electrical connectors 34, 36, 38 and 41 are omitted from the drive unit 20, electric cables can be directly provided on the drive unit 20. In a case where the electrical connectors 64, 66, 68 and 69 are omitted from the battery unit 50, electric cables can be directly provided on the battery unit 50.

It is preferred that the first electrical connector 34 and the fourth electrical connector 64 be shaped so as to be suitable for transmission of larger power than the second electrical connector 36 and the fifth electrical connector 66. The battery unit 50 further includes a first protection circuit electrically connected to the first power supply path 80 and a second protection circuit electrically connected to the second power supply path 82. The first protection circuit includes an IC that monitors voltage and current supplied to the first power supply path 80. The second protection circuit can include an IC that monitors voltage and current supplied to the second power supply path 82 or can be configured only by a logic circuit element. The first protection circuit is configured to prevent overcharging and over-discharging of the battery 52. Since power supplied to the first power supply path 80 is larger than power supplied to the second power supply path 82, the first protection circuit needs to have a higher protection function than the second protection circuit. Thus, the first protection circuit consumes more power than the second protection circuit. In a case where power is supplied to the first power supply path 80, the first protection circuit is operated. In a case where power is not supplied to the first power supply path 80, the operation of the first protection circuit is stopped. Thus, the power consumption is reduced in a case where power is not supplied to the first power supply path 80.

The third power supply path 84 supplies the bicycle component 12 with power that is supplied via the second power supply path 82. The third power supply path 84 includes the seventh electrical connector 40, an electrical connector 12A of the bicycle component 12, and a third electrical conductor 84A electrically connecting the seventh electrical connector 40 and the electrical connector 12A. The seventh electrical connector 40 is electrically connected to the battery unit 50. The third power supply path 84 is electrically connected to the third electrical connector 38. The third power supply path 84 supplies the bicycle component 12 with power that is supplied via the third electrical connector 38. The third electrical conductor 84A can be configured to include an electric plug and an electric cable. It is preferred that the electric plug include a terminal connected to the seventh electrical connector 40 and be configured to be attachable to and removable from the battery unit 50. It is preferred that the electric plug further include a terminal connected to the electrical connector 12A and be configured to be attachable to and removable from the bicycle component 12. In a further example, in a case where the third electrical conductor 84A is omitted, the third electrical connector 38 and the electrical connector 12A can be configured to be directly connected to each other. In a case where the seventh electrical connector 40 is omitted, the electric cable can be directly provided on the battery unit 50. In a case where the electrical connector 12A is omitted, the electric cable can be directly provided on the bicycle component 12.

The electrical configuration of the battery unit 50 will now be described. The first switch 54 is provided between the battery 52 and the first power supply path 80. The first switch 54 changes the electrical connection state of the battery 52 and the first power supply path 80. The first switching portion 54 is provided between the battery 52 and the fourth electrical connector 64. The first switching portion 54 changes the electrical connection state of the battery 52 and the fourth electrical connector 64. The first switch 54 is configured to be switched on and off by the first controller 56. The first switch 54 is switched off to stop the supply of power from the battery 52 to components located at the downstream side of the first switch 54. The components located at the downstream side of the first switch 54 are each component of the drive unit 20 including the fourth electrical connector 64, the first electrical conductor 80A, and the first electrical connector 34. In one example, the first switching portion 54 includes a field effect transistor (FET).

The first voltage converter 58 is provided between the battery 52 and the fifth electrical connector 66. The first voltage converter 58 converts voltage of the battery 52 and transmits the voltage to the second power supply path 82.

The first voltage converter 58 converts voltage of the battery 52 and transmits the voltage to the fifth electrical connector 66. The first voltage converter 58 includes, for example, a linear regulator. The linear regulator includes, for example, a low drop-out (LDO) regulator. The diode 70 is provided between the first voltage converter 58 and the fifth electrical connector 66. The anode of the diode 70 is connected to the first voltage converter 58. The cathode of the diode 70 is connected to the fifth electrical connector 66.

The fourth voltage converter 60 is provided between the battery 52 and the sixth electrical connector 68. The fourth voltage converter 60 converts voltage of the battery 52 and transmits the voltage to the third power supply path 84. The fourth voltage converter 60 includes, for example, a linear regulator. The linear regulator includes, for example, an LDO regulator. The output of the fourth voltage converter 60 is provided to the sixth electrical connector 68 via an inductor.

The output of the fourth voltage converter 60 is provided to the communication circuit 62. The communication circuit 62 is operated by power provided from the fourth voltage converter 60. The fourth voltage converter 60 can be connected to the first controller 56 to provide the first controller 56 with power that operates the first controller 56. The communication circuit 62 transmits and receives information through power line communication. Information input to the communication circuit 62 is transmitted to the first controller 56, which is connected to the communication circuit 62. Information output from the first controller 56 is transmitted to the sixth electrical connector 68 via the communication circuit 62 and then transmitted from the communication path 86 via the sixth electrical connector 68. The communication circuit 62 is connected to the sixth electrical connector 68 via the capacitor 72.

The first controller 56 receives an input signal S via the sixth electrical connector 68. The input signal S can be related to a signal output from the bicycle component 12. The signal output from the bicycle component 12 is related to, for example, at least one of a signal that is output from the operation device 14B in accordance with an operation input to the operation device 14B and a signal that is output from the vehicle speed sensor 14D in accordance with a start of the bicycle B for traveling. The input signal S can be related to a signal output from a sensor provided on the drive unit 20. The signal output from a sensor provided on the drive unit 20 includes at least one of a signal that is output from the torque sensor 21B in accordance with application of human driving force to the crank C and a signal that is output from the crank rotation sensor 21A in accordance with rotation of the crank C. The first controller 56 is configured to perform power line communication via the sixth electrical connector 68. The first controller 56 is configured to perform power line communication via the communication path 86. The first controller 56 can be configured to perform power line communication via the fifth electrical connector 66 and the second power supply path 82. The first controller 56 can further include a reception portion configured to receive the input signal S through wireless communication. The reception portion can be provided on the communication circuit 62.

The positive electrode of the battery 52 is connected to the first switch 54. The negative electrode of the battery 52 is connected to the ninth electrical connector 69.

In a case where the drive unit 20 and the battery unit 50 are connected by the first power supply path 80 and the second power supply path 82, the bicycle drive system 10 is configured to switch between a first state and a second state.

In the first state, the battery unit 50 stops the supply of power to the drive unit 20 via the first power supply path 80 and supplies power to the drive unit 20 via the second power supply path 82. In the second state, the battery unit 50 supplies power to the drive unit 20 via at least the first power supply path 80.

In the second state, the bicycle drive system 10 can control the bicycle electric component 16 and perform power line communication via the communication path 86 and the third power supply path 84. In the second state, the bicycle drive system 10 can detect human driving force with the torque sensor 21B and also detect rotation of the crank C with the crank rotation sensor 21A. In the first state, the bicycle drive system 10 can control the bicycle electric component 16, perform power line communication via the communication path 86 and the third power supply path 84, drive the motor 22, and perform an operation for switching the contents on the display 14M of the cycle computer 14A.

The battery unit 50 is switched from the first state to the second state in accordance with the input signal S transmitted from at least one of the drive unit 20 and the bicycle component 12, which uses power supplied via the drive unit 20. The first controller 56 receives the input signal S from the bicycle component 12 via the third power supply path 84. The first controller 56 receives the input signals S from the drive unit 20 and the bicycle component 12 via the communication path 86.

The first controller 56 is configured to switch between the first state and the second state. In the first state, the supply of power to the drive unit 20 via the fourth electrical connector 64 is stopped, and power is supplied to the drive unit 20 via the fifth electrical connector 66. In the second state, power is supplied to the drive unit 20 via at least the fourth electrical connector 64. The first controller 56 switches from the first state to the second state in accordance with the input signal S transmitted from at least one of the drive unit 20 and the bicycle component 12. The first controller 56 controls the electrical connection state of the first switch 54 in accordance with the input signal S.

The electrical configuration of the drive unit 20 will now be described. The second voltage converter 26 is connected to the first electrical connector 34. The second voltage converter 26 is connected to the first power supply path 80 to convert a voltage. The second voltage converter 26 converts the voltage of power supplied via the first electrical connector 34. The output of the second voltage converter 26 is provided to the electrical connector 40 via an inductor. The output of the second voltage converter 26 is also provided to the communication circuit 32 and to the electrical connector 38 via a capacitor 44. The second voltage converter 26 includes, for example, a converter. The converter includes a step-down DC/DC converter. The capacitor 44 can be omitted.

The third voltage converter 28 is connected to the second electrical connector 36. The third voltage converter 28 is connected to the second power supply path 82 to convert a voltage. The third voltage converter 28 converts the voltage of power supplied via the second electrical connector 36. The output voltage of the third voltage converter 28 is substantially equal to the output voltage of the second voltage converter 26. The output of the third voltage converter 28 is provided to the electrical connector 40 via an inductor and also to the electrical connector 38 via the capacitor 44. The third voltage converter 28 includes, for example, a linear regulator. The linear regulator includes, for example, an LDO.

The fifth voltage converter 30 includes a linear regulator. The linear regulator includes, for example, an LDO. The fifth voltage converter 30 is connected to the second voltage converter 26 and the second electrical connector 36 to convert the voltage output from the second voltage converter 26 and the voltage input to the second electrical connector 36 and provide the converted voltages to the communication circuit 32. The communication circuit 32 is operated by power supplied from the second voltage converter 26. The second voltage converter 26 can be connected to the second controller 24 so that the second controller 24 is supplied with power that operates the second controller 24.

The communication circuit 32 communicates with the battery unit 50 via the third electrical connector 38. The communication circuit 32 is configured to perform power line communication via the third electrical connector 38. The communication circuit 32 is configured to communicate with the operation device 14B. The communication circuit 32 can be configured to perform wireless communication with an external device. The external device can be, for example, a smartphone or a bicycle component 12. A capacitor 42 is provided between the seventh electrical connector 40 and the third electrical connector 38. The capacitor 44 is provided between the communication circuit 32 and the third electrical connector 38.

The second controller 24 is configured to perform power line communication with the bicycle component 12. The second controller 24 controls the motor 22. The second controller 24 is operable in a third state, in which the motor 22 is drivable, and a fourth state, which consumes less power than the third state and does not drive the motor 22. The second controller 24 is activated by power supplied from at least one of the first power supply path 80 and the second power supply path 82. If the state is changed from where the battery unit 50 and the drive unit 20 are electrically disconnected to where the battery unit 50 and the drive unit 20 are electrically connected, power is supplied from the second electrical conductor 82A to activate the second controller 24 in the fourth state. In the fourth state, the second controller 24 controls the motor 22 in accordance with a signal output from at least one of the torque sensor 21B, the crank rotation sensor 21A and a speed sensor. The second controller 24 drives and stops the motor 22 by controlling the inverter 31.

In a case where the second controller 24 is operated in the fourth state, if the communication circuit 32 receives the input signal S, the second controller 24 switches the operation state from the fourth state to the third state. In a case where the second controller 24 is operated in the fourth state, if the communication circuit 32 receives the input signal S and is also supplied with power from the first power supply path 80, the operation state can be switched from the fourth state to the third state.

In a case where the motor 22 of the drive unit 20 is not driven and also the battery unit 50 does not receive the input signal S for a predetermined time in the second state, the battery unit 50 stops the supply of power to the drive unit 20 via the first power supply path 80. In the case where the motor 22 of the drive unit 20 is not driven and also the battery unit 50 does not receive the input signal S for the predetermined time in the second state, the battery unit 50 stops the supply of power from the fourth electrical connector 64.

In the present embodiment, also in the second state, the battery unit 50 supplies power to the drive unit 20 via the second power supply path 82. In the case of switching a power supply path, the supply of power to the second controller 24 can be interrupted depending on a switching timing, which results in the need to reactivate the second controller 24. In this regard, power is constantly supplied to the drive unit 20 via the second power supply path 82 to prevent the second controller 24 from being stopped even in the case of switching from the second state to the first state.

The battery unit 50 can be configured not to supply power to the bicycle drive unit 20 via the second power supply path 82 in the second state. The battery unit 50 can be configured not to supply power to the bicycle drive unit 20 via the fifth electrical connector 66 in the second state. In this case, for example, a second switch is provided between the battery 52 and the first voltage converter 58, and the first controller 56 controls the supply of power.

Figure 4:
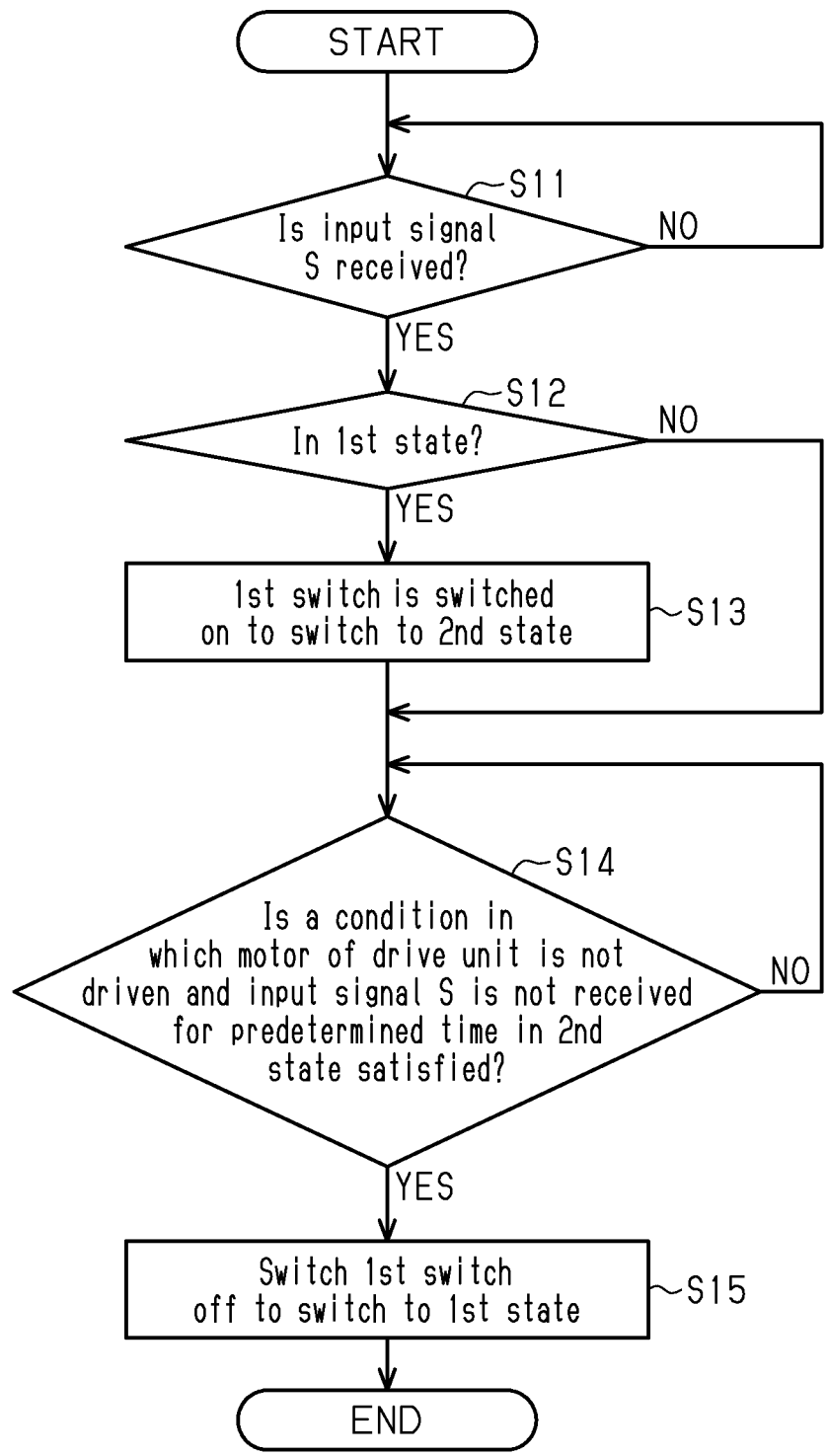
FIG. 4 is a flowchart showing a control procedure that is executed by the bicycle drive system for performing a switching process on the bicycle battery unit of the bicycle drive system of FIG. 2.

The process for switching the bicycle drive system 10 from the first state to the second state will now be described with reference to FIG. 4. The first controller 56 executes the switching process in predetermined cycles. In a case where the battery 52 starts to supply power, the first controller 56 is activated and starts the process. The first controller 56 can be configured to start the process in a case where the state is changed from where the battery unit 50 and the drive unit 20 are electrically disconnected to where the battery unit 50 and the drive unit 20 are electrically connected. If power is supplied via the second power supply path 82, the second controller 24 is activated in the fourth state, which does not drive the motor 22.

In step S11, the first controller 56 determines whether or not an input signal S is received from the drive unit 20 or the bicycle component 12 as a result of an operation performed on a bicycle component 12. If the first controller 56 determines that the input signal S is received, the first controller 56 proceeds to step S12. If the first controller 56 does not determine that the input signal S is received, the first controller 56 again executes step S11 after the predetermined cycle.

If the first controller 56 determines in step S11 that the input signal S is received, the first controller 56 determines in step S12 whether or not the battery unit 50 is in the first state. If the first controller 56 determines in step S12 that the battery unit 50 is in the second state, the first controller 56 skips step S13 and proceeds to step S14. If the battery unit 50 is in the first state, in step S13, the first controller 56 switches the first switch 54 from the OFF state to the ON state. This switches the battery unit 50 from the first state to the second state. Consequently, power is supplied to the drive unit 20 through the first power supply path 80. The power supplied through the first power supply path 80 switches the second controller 24 of the drive unit 20 from the fourth state, which does not drive the motor 22, to the third state, which drives the motor 22.

In step S14, the first controller 56 determines whether the motor 22 of the drive unit 20 is not driven and also whether the input signal S is not received for the predetermined time in the second state. In step S14, if at least one of the determinations, which are a determination that the motor 22 of the drive unit 20 is driven in the second state and a determination that the input signal S is received within the predetermined time in the second state, is made, the first controller 56 again executes step S14 after the predetermined cycle. If the first controller 56 determines in step S14 that the motor 22 of the drive unit 20 is not driven and also that the input signal S is not received for the predetermined time in the second state, the first controller 56 proceeds to step S15 and switches the first switch 54 from the ON state to the OFF state. This switches the battery unit 50 from the second state to the first state and stops the supply of power to the drive unit 20 from the first power supply path 80. If step S15 is executed in the first state, the display 14M of the cycle computer 14A, which is shown in FIG. 2, shows information indicating the first state. One example of the information indicating the first state includes letter information such as, for example, "standby mode." If step S15 is executed, the stoppage of supply of power from the first power supply path 80 causes the second controller 24 of the drive unit 20 to be switched from the third state, which drives the motor 22, to the fourth state, which does not drive the motor 22. Whether the information indicating the first state is shown on the display 14M or not in the first state can be configured to be selected by the user. The user can use, for example, an operation switch provided on the cycle computer 14A or an external device to set the contents shown on the display 14M.

Second Embodiment

Figure 5:
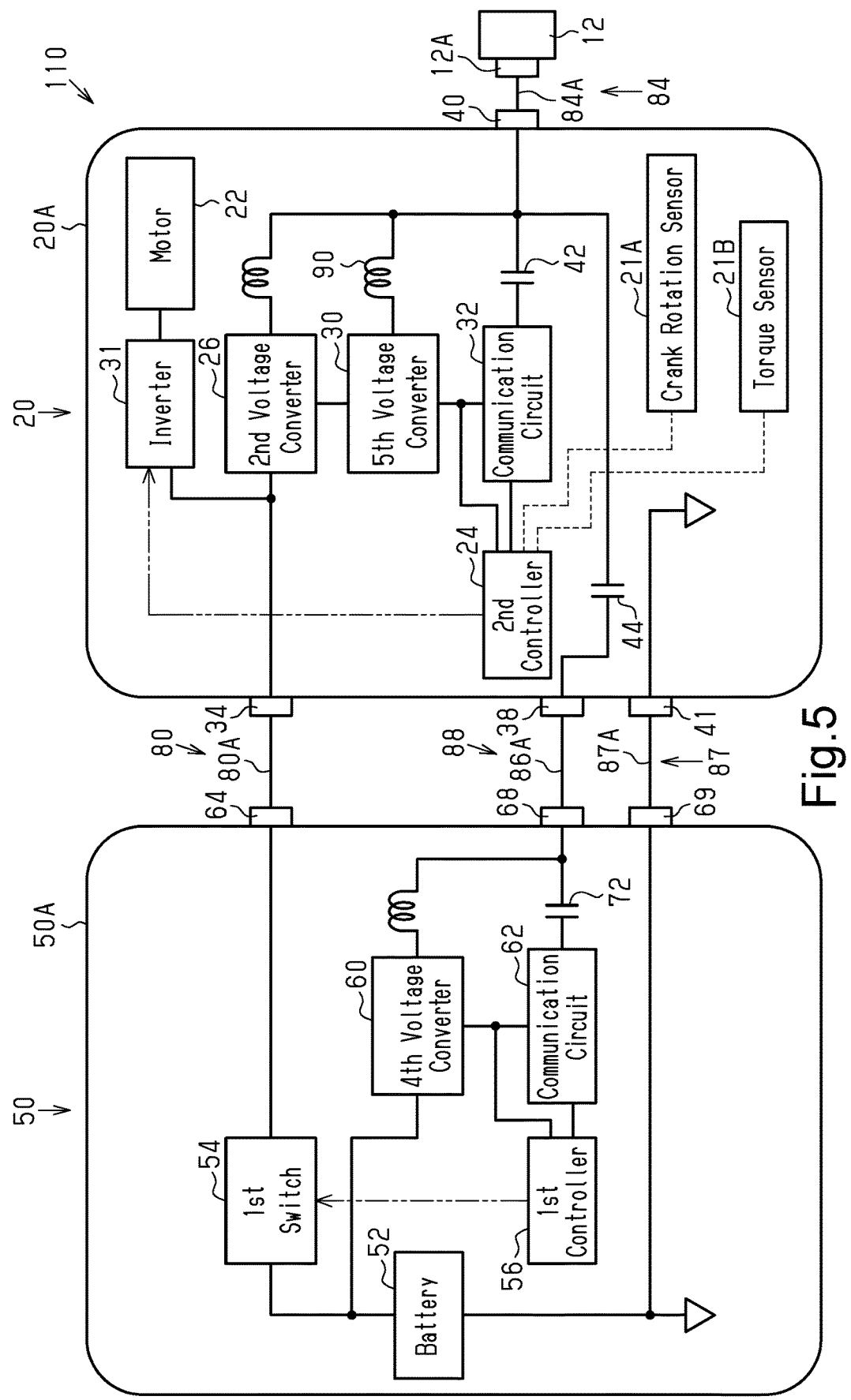
FIG. 5 is a block diagram showing an electrical configuration of a bicycle drive system in accordance with a second embodiment.

A second embodiment of the bicycle drive system 110 will now be described with reference to FIG. 5. The bicycle drive system 110 of the second embodiment is the same as the bicycle drive system 10 of the first embodiment except that the bicycle drive system 110 of the second embodiment includes a second power supply path 88 instead of the second power supply path 82 and the communication path 86. The same reference characters are given to those components that are the same as the corresponding components of the first embodiment. Such components will not be described in detail.

The bicycle drive system 110 includes the first power supply path 80 and the second power supply path 88. The second power supply path 88 has the same configuration as the communication path 86 (refer to FIG. 3). The bicycle drive system 110 is configured to omit the first voltage converter 58, the diode 70, the fifth electrical connector 66, the second power supply path 82, the second electrical connector 36, the third voltage converter 28, and the inductor 29 from the bicycle drive system 10 of the first embodiment and include an inductor 90. The inductor 90, which is provided between the fifth voltage converter 30 and each of the third electrical connector 38 and the seventh electrical connector 40, is used to supply power to the fifth voltage converter 30. The second power supply path 88 is used to supply power from the battery unit 50 to the drive unit 20 and also perform power line communication among the battery unit 50, the drive unit 20, and the bicycle component 12.

In the second state, the battery unit 50 supplies power to the drive unit 20 via the second power supply path 88. In the second state, the battery unit 50 supplies power to the drive unit 20 via the sixth electrical connector 68.

Third Embodiment

A third embodiment of a bicycle power supply system 120 will now be described with reference to FIGS. 6 and 7. The bicycle power supply system 120 of the third embodiment is the same as the bicycle drive system 10 of the first embodiment except that a battery unit 130 is directly connectable to the bicycle component 122 in addition to the drive unit 20. Thus, the same reference characters are given to those components of the bicycle power supply system 120 of the third embodiment that are the same as the corresponding components of the first embodiment. Such components will not be described in detail.

Figure 6:
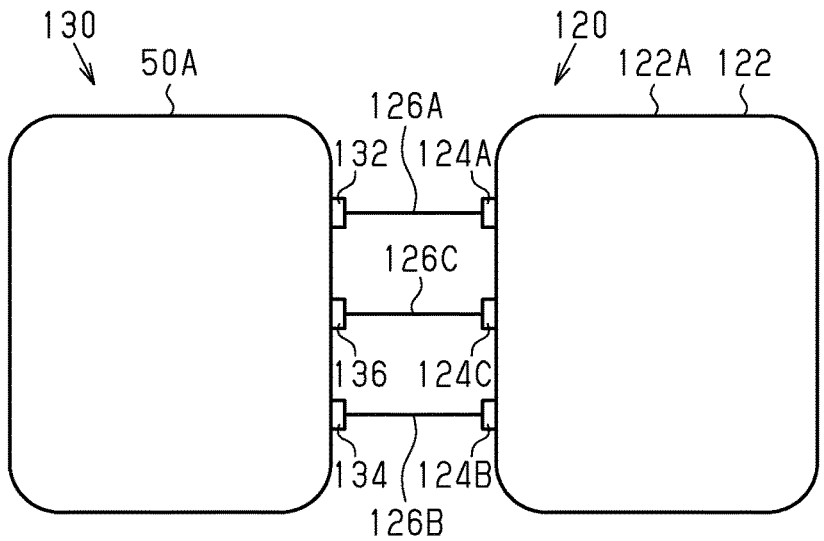
FIG. 6 is a block diagram showing an electrical configuration of a bicycle power supply system in accordance with a third embodiment.

As shown in FIG. 6, the bicycle power supply system 120 includes the battery unit 130. The battery unit 130 is configured to supply power to a bicycle component 122. The bicycle component 122 includes at least one of the cycle computer 14A, the operation device 14B, the sensor 14C, the bicycle electric component 16, and the bicycle drive unit 20, which are shown in FIG. 2.

Figure 7:
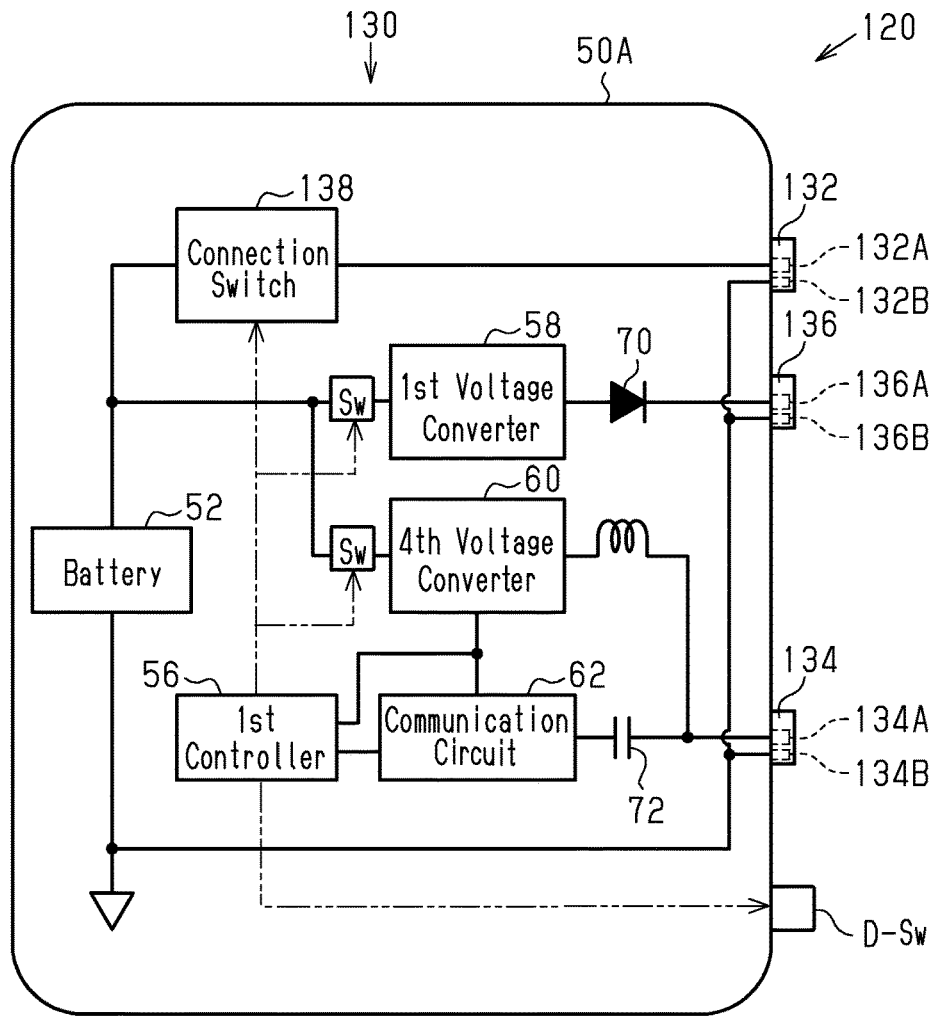
FIG. 7 is a block diagram showing an electrical configuration of a bicycle battery unit of the third embodiment.

As shown in FIG. 7, the battery unit 130 includes the housing 50A, the battery 52, a first electrical connector 132, a second electrical connector 134, and the communication circuit 62. The battery unit 130 further includes a third electrical connector 136 and a connection switch 138. In one example, the battery unit 130 further includes the first controller 56, the first voltage converter 58, the fourth voltage converter 60, the diode 70 and the capacitor 72.

The first electrical connector 132 is provided in the housing 50A so as to be at least partially exposed to the exterior. The first electrical connector 132 is configured to be electrically connected to the battery 52. The first electrical connector 132 has the same structure as the fourth electrical connector 64 of the first embodiment.

The second electrical connector 134 is provided in the housing 50A so as to be at least partially exposed to the exterior. The second electrical connector 134 is provided separately from the first electrical connector 132. The second electrical connector 134 has the same structure as the sixth electrical connector 68 of the first embodiment. The communication circuit 62 is electrically connected to the second electrical connector 134 and configured to perform power line communication via the second electrical connector 134. Thus, the communication circuit 62 is a power line communication circuit.

The third electrical connector 136 is provided in the housing 50A so as to be at least partially exposed to the exterior. The third electrical connector 136 is configured to be electrically connected to the battery 52. The third electrical connector 136 is provided separately from the first electrical connector 132 and the second electrical connector 134. The third electrical connector 136 has the same structure as the fifth electrical connector 66 of the first embodiment.

The first electrical connector 132 and the third electrical connector 136 are configured to supply power from the battery 52 to the same bicycle component 122. The output voltage of the first electrical connector 132 from the battery 52 is greater than the output voltage of the third electrical connector 136 from the battery 52. The output voltage of the first electrical connector 132 is greater than the output voltage of the second electrical connector 134. The output voltage of the first electrical connector 132 is greater than or equal to 20 V and less than 60 V. The output voltage of the second electrical connector 134 is greater than or equal to 1 V and less than 20 V.

The third electrical connector 136 is electrically connected to the battery 52. In a case where the charge level of the battery 52 is greater than or equal to a predetermined level, a predetermined first voltage is applied to the third electrical connector 136 from the battery 52. In one example, the first voltage is greater than or equal to 5 V and less than 9 V.

The second electrical connector 134 is electrically connected to the battery 52. In a case where the charge level of the battery 52 is greater than or equal to a predetermined level, a predetermined second voltage is applied to the second electrical connector 134 from the battery 52. In one example, the second voltage is greater than or equal to 1 V and less than 20 V.

The first electrical connector 132 includes a first positive terminal 132A. The second electrical connector 134 includes a second positive terminal 134A. The third electrical connector 136 includes a third positive terminal 136A. At least one of the first electrical connector 132, the second electrical connector 134, and the third electrical connector 136 includes a ground terminal. In the battery unit 130 of the present embodiment, the first electrical connector 132 includes the first positive terminal 132A and a first ground terminal 132B, the second electrical connector 134 includes the second positive terminal 134A and a second ground terminal 134B, and the third electrical connector 136 includes the third positive terminal 136A and a third ground terminal 136B.

As shown in FIG. 6, the bicycle component 122 includes a housing 122A, a fourth electrical connector 124A, a fifth electrical connector 124B, and a sixth electrical connector 124C.

The fourth electrical connector 124A is provided in the housing 122A so as to be at least partially exposed to the exterior. The fourth electrical connector 124A is configured to be electrically connected to the first electrical connector 132. The fourth electrical connector 124A is connected to the first electrical connector 132 by a power line 126A. The battery unit 130 and the bicycle component 122 exchange information with each other via the fourth electrical connector 124A and the first electrical connector 132.

The fifth electrical connector 124B is provided in the housing 122A so as to be at least partially exposed to the exterior. The fifth electrical connector 124B is configured to be electrically connected to the second electrical connector 134. The fifth electrical connector 124B is connected to the second electrical connector 134 by a power communication line 126B. The battery unit 130 and the bicycle component 122 exchange information with each other via the fifth electrical connector 124B and the second electrical connector 134. Additionally, the battery unit 130 supplies power to the bicycle component 122 via the fifth electrical connector 124B and the second electrical connector 134.

The sixth electrical connector 124C is provided in the housing 122A so as to be at least partially exposed to the exterior. The sixth electrical connector 124C is configured to be electrically connected to the third electrical connector 136. The sixth electrical connector 124C is connected to the third electrical connector 136 by a power line 126C. The battery unit 130 and the bicycle component 122 exchange information with each other via the sixth electrical connector 124C and the third electrical connector 136. Additionally, the battery unit 130 supplies power to the bicycle component 122 via the sixth electrical connector 124C and the third electrical connector 136.

The connection switch 138 has the same structure as the first switch 54 of the first embodiment. The connection switch 138 changes the electrical connection state of the first electrical connector 132 and the battery 52 in accordance with a communication result of the communication circuit 62. For example, in a case where the cycle computer 14A (refer to FIG. 2) is operated to input a signal for stopping the operation of the bicycle component 122 to the communication circuit 62, the first controller 56 disconnects the first electrical connector 132 and the battery 52 with the connection switch 138. In a state where the first electrical connector 132 and the battery 52 are disconnected by the connection switch 138, if a signal for starting to operate the bicycle component 122 is input to the communication circuit 62, the first controller 56 electrically connects the first electrical connector 132 and the battery 52 with the connection switch 138.

Modifications

The above description illustrates embodiments of a bicycle drive system, a bicycle drive unit, and a bicycle battery unit according to the present invention and is not intended to limit modes of the present invention. The embodiments of the bicycle drive system, the bicycle drive unit, and the bicycle battery unit of the present invention can be modified as follows. Further, two or more of the modifications can be combined. In the following modifications, the same reference characters are given to those components that are the same as the corresponding components of the embodiments. Such components will not be described in detail.

In the first embodiment, the first controller 56, the second controller 24, and the bicycle components 12 can perform normal wired communication instead of power line communication. In this case, the communication circuits 62 and 32 and the communication circuits or devices of the bicycle components 12 are electrically connected by communication lines provided separately from the power supply wiring.

In the second embodiment, the battery unit 50 can be configured not to supply power to the drive unit 20 via the second power supply path 82 in the second state. In this case, in the second state, the battery unit 50 does not supply power to the drive unit 20 via the fifth electrical connector 66. In this case, for example, the first controller 56 controls the supply of power using a second switch provided between the battery 52 and the first voltage converter 58.

Figure 8:
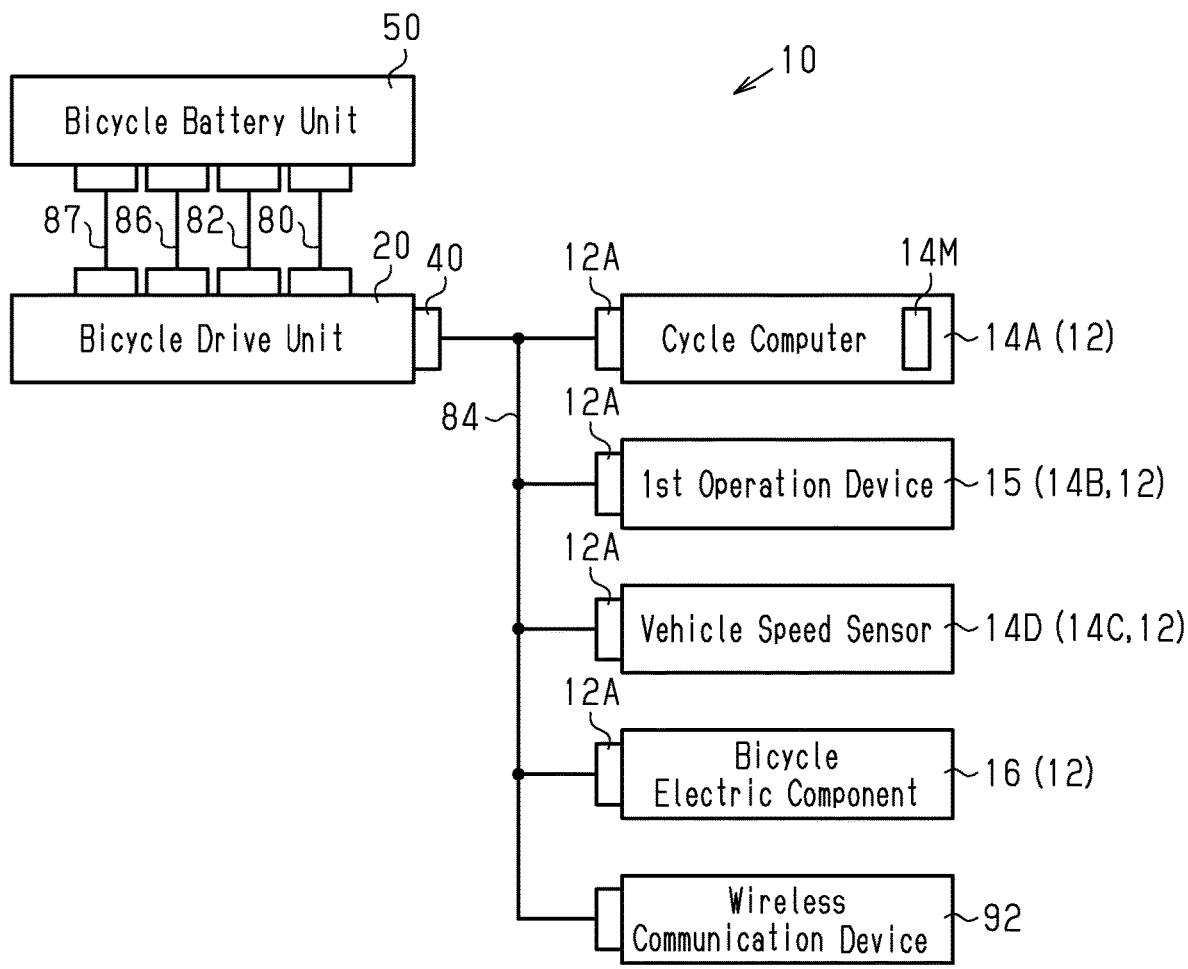
FIG. 8 is a block diagram showing an electrical configuration of a first modification of a bicycle drive system.

The bicycle drive systems 10, 110 can further include a wireless communication device 92, which is shown in FIG. 8. The wireless communication device 92 is configured to perform wireless communication with an external device using power supplied via the second power supply paths 82 and 88. In the same manner as the bicycle component 12, the wireless communication device 92 is connected to the third power supply path 84 and supplied with power from the third power supply path 84. In the first state, if the wireless communication device 92 receives a predetermined signal, the battery unit 50 is switched from the first state to the second state. The external device includes, for example, a smartphone, a tablet PC, a cycle computer, or a personal computer. In a case where the user inputs an operation for switching the operation state of the battery unit 50 from the second state to the first state to the external device, the predetermined signal is input to the wireless communication device 92. The wireless communication device 92 can be provided integrally with at least one of the bicycle component 12 and the drive unit 20.

The modification shown in FIG. 8 can be configured to update at least one of the setting and software of the drive unit 20 based on information transmitted from the external device via the wireless communication device 92 in the first state.

In each embodiment, the first controller 56, the second controller 24, and the bicycle components 12 can perform wireless communication instead of power line communication. In this case, the communication circuits 62 and 32 and the communication circuits or devices of the bicycle component 12 are each configured to include a wireless communication circuit or device. In the first embodiment, in a case where the first controller 56 and the second controller 24 perform wireless communication with each other, the communication path 86 is omitted if the second controller 24 and the communication circuit or device of the bicycle component 12 perform wireless communication with each other.

The second controller 24 can be activated by power supplied from the first power supply path 80. In this case, the second controller 24 is activated by power supplied from the first electrical connector 34.

The battery unit 50 can include a switch that supplies power from the second power supply path 82 to the drive unit 20 and stops the supply of power.

In the third embodiment, in a case where the charge level of the battery 52 is greater than or equal to the predetermined level, if an external electrical connector is connected to the third electrical connector 136, the third electrical connector 136 and the battery 52 can be electrically connected by the first controller 56 so that the predetermined first voltage is applied to the third electrical connector 136. The first controller 56 is configured to detect the charge level of the battery 52. The first controller 56 includes at least one of a voltage sensor that detects the voltage of the battery 52, a current sensor that detects the current output from the battery 52, and a current sensor that detects the current input to the battery 52 so that the charge level of the battery 52 is detected with the sensor. The first controller 56 is configured to detect at least one of the voltage and current of the third electrical connector 136. The first controller 56 includes a sensor that detects at least one of the voltage and current of the third electrical connector 136. The first controller 56 determines whether or not the external electrical connector is connected based on at least one of the voltage and current of the third electrical connector 136. The external electrical connector corresponds to the sixth electrical connector 124C of the bicycle component 122. In this modification, at least one of the third electrical connector 136 and the sixth electrical connector 124C can be configured to be attachable to and removable from the power line 126C.

In the third embodiment, in a case where the charge level of the battery 52 is greater than or equal to the predetermined level, if the housing 50A is attached to the bicycle B, the third electrical connector 136 and the battery 52 can be electrically connected by the first controller 56 so that the predetermined first voltage is applied to the third electrical connector 136. The first controller 56 is configured to detect the charge level of the battery 52. The first controller 56 includes at least one of a voltage sensor that detects the voltage of the battery 52, a current sensor that detects the current output from the battery 52, and a current sensor that detects the current input to the battery 52 so that the charge level of the battery 52 is detected with the sensor. The housing 50A is provided with a sensor for detecting that the housing 50A is attached to the bicycle B. The sensor for detecting that the housing 50A is attached to the bicycle B includes, for example, an attachment detection switch D-Sw that contacts the bicycle B in a state where the housing 50A is attached to the bicycle B. The attachment detection switch D-Sw includes, for example, a tact switch and is configured to connect the contact points in a case where the housing 50A is attached to the bicycle B. The sensor for detecting that the housing 50A is attached to the bicycle B can include, for example, a sensor, the output of which varies in accordance with the distance from the bicycle B. In another example, the sensor for detecting that the housing 50A is attached to the bicycle B can include a sensor that changes the output in a case where the housing 50A is attached to the bicycle B from a case where the housing 50A is removed from the bicycle B. A switch Sw that is controlled by the first controller 56 is provided in the electrical connection path of the third electrical connector 136 and the battery 52. If the first controller 56 determines that the housing 50A is attached to the bicycle B based on the attachment detection switch D-Sw, the first controller 56 controls the switch Sw to apply the predetermined first voltage to the third electrical connector 136.

In the third embodiment, in a case where the charge level of the battery 52 is greater than or equal to the predetermined level, if an external electrical connector is connected to the second electrical connector 134, the second electrical connector 134 and the battery 52 can be electrically connected by the first controller 56 so that the predetermined second voltage is applied to the second electrical connector 134. The first controller 56 is configured to detect the charge level of the battery 52. The first controller 56 includes at least one of a voltage sensor that detects the voltage of the battery 52, a current sensor that detects the current output from the battery 52, and a current sensor that detects the current input to the battery 52 so that the charge level of the battery 52 is detected with the sensor. The first controller 56 is configured to detect at least one of the voltage and current of the second electrical connector 134. The first controller 56 includes a sensor that detects at least one of the voltage and current of the second electrical connector 134. The first controller 56 determines whether or not the external electrical connector is connected based on at least one of the voltage and current of the second electrical connector 134. The external electrical connector corresponds to the fifth electrical connector 124B of the bicycle component 122. In this modification, at least one of the second electrical connector 134 and the fifth electrical connector 124B can be configured to be attachable to and removable from the power communication line 126B.

In the third embodiment, in a case where the charge level of the battery 52 is greater than or equal to the predetermined level, if the housing 50A is attached to the bicycle B, the second electrical connector 134 and the battery 52 can be electrically connected by the first controller 56 so that the predetermined second voltage is applied to the second electrical connector 134. The first controller 56 is configured to detect the charge level of the battery 52. The first controller 56 includes at least one of a voltage sensor that detects the voltage of the battery 52, a current sensor that detects the current output from the battery 52, and a current sensor that detects the current input to the battery 52 so that the charge level of the battery 52 is detected with the sensor. The housing 50A is provided with a sensor for detecting that the housing 50A is attached to the bicycle B. The sensor for detecting that the housing 50A is attached to the bicycle B includes, for example, the attachment detection switch D-Sw that contacts the bicycle B in a state where the housing 50A is attached to the bicycle B. The sensor for detecting that the housing 50A is attached to the bicycle B can include, for example, a sensor, the output of which varies in accordance with the distance from the bicycle B. In another example, the sensor for detecting that the housing 50A is attached to the bicycle B can include a sensor that changes the output in a case where the housing 50A is attached to the bicycle B from a case where the housing 50A is removed from the bicycle B. A switch Sw that is controlled by the first controller 56 is provided in the electrical connection path of the second electrical connector 134 and the battery 52. If the first controller 56 determines that the housing 50A is attached to the bicycle B based on the attachment detection switch D-Sw, the first controller 56 controls the switch Sw to apply the predetermined second voltage to the second electrical connector 134.

In the first and second embodiments and the modifications of the embodiments, the fourth electrical connector 64 can include the first positive terminal 64A and a first ground terminal 64B, which are indicated by double-dashed lines in FIG. 3. In the first embodiment and the modifications of the first embodiment, the fifth electrical connector 66 can include the second positive terminal 66A and a second ground terminal 66B, which are indicated by double-dashed lines in FIG. 3. Also, in the first and second embodiments and the modifications of the embodiments, the sixth electrical connector 68 can include the third positive terminal 68A and a third ground terminal 68B, which are indicated by double-dashed lines in FIG. 3. In the first embodiment and the modifications of the first embodiment, in a case where the fourth electrical connector 64, the fifth electrical connector 66, and the sixth electrical connector 68 respectively include the ground terminals 64B, 66B and 68B, the ninth electrical connector 69 is omitted. In the second embodiment and the modifications of the second embodiment, in a case where the fourth electrical connector 64 and the sixth electrical connector 68 respectively include the ground terminals 64B, 68B, the ninth electrical connector 69 is omitted.

In the third embodiment and the modifications of the third embodiment, one of the first ground terminal 132B and the second ground terminal 134B can be omitted. In this case, the first electrical connector 132 includes the first positive terminal 132A, the second electrical connector 134 includes the second positive terminal 134A, and one of the first electrical connector 132 and the second electrical connector 134 includes the ground terminals 132B and 134B.

In the third embodiment and the modifications of the third embodiment, at least one of the first ground terminal 132B, the second ground terminal 134B, and the third ground terminal 136B can be omitted. In this case, the first electrical connector 132 includes the first positive terminal 132A, the second electrical connector 134 includes the second positive terminal 134A, the third electrical connector 136 includes the third positive terminal 136A, and one or two of the first electrical connector 132, the second electrical connector 134, and the third electrical connector 136 include the ground terminals 132B, 134B and 136B.

The third electrical connector 136, the first voltage converter 58, and the diode 70 can be omitted from the third embodiment.

Figure 9:
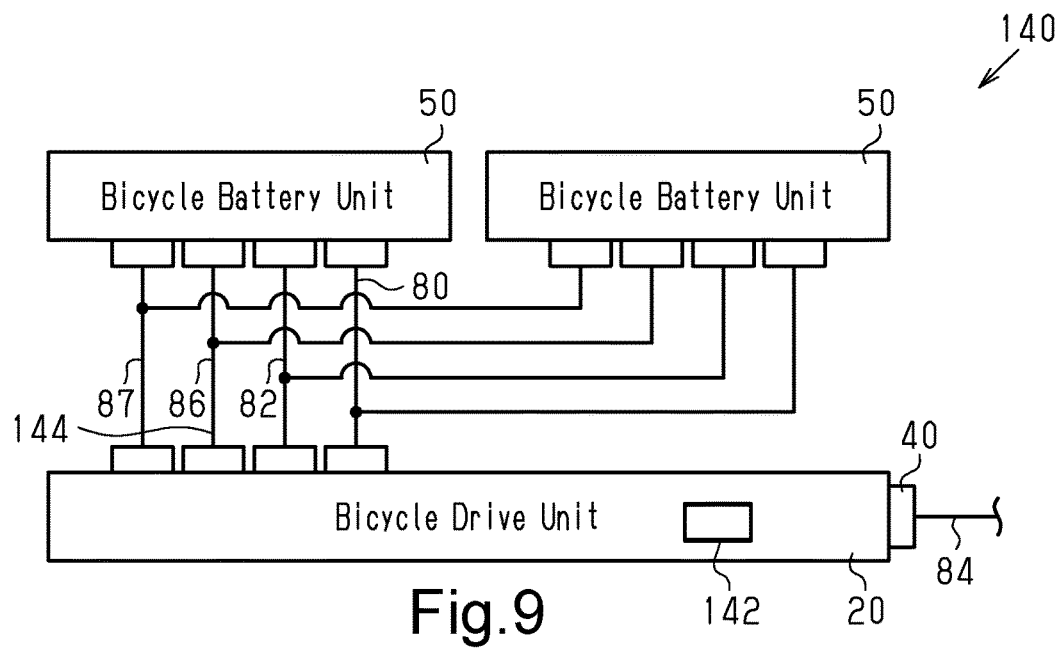
FIG. 9 is a block diagram showing an electrical configuration of a second modification of a bicycle drive system.

As shown in FIG. 9, a bicycle drive system 140 can include a plurality of battery units 50 connected to the drive unit 20. The bicycle drive system 140 includes the motor 22 (refer to FIG. 2), the plurality of battery units 50, and an electronic control unit 142. The bicycle drive system 140 further includes a power line 144. The plurality of the battery units 50 each includes the communication circuit 62 and the first controller 56 (refer to FIG. 3). The communication circuit 62 corresponds to a first communication circuit or device electrically connected to the first controller 56. The first controller 56 controls the output of power supplied to the motor 22. The control unit 142 includes the communication circuit 32 and the second controller 24. The control unit 142 includes the motor 22. The communication circuit 32 corresponds to a second communication circuit or device configured to communicate with the first communication circuit or device 62 via the power line 144. The control unit 142 is included in the bicycle drive unit 20. The second controller 24 is electrically connected to the communication circuit 32 and configured to have the first controller 56 output power supplied to the motor 22. In a case where the battery units 50 are connected to the drive unit 20, the electrical power supply paths 80, 82, 86 and 87 are divided to connect the battery units 50 in parallel. In the case of receiving the input signal S, the battery units 50 can each be switched from the second state to the first state. Alternatively, only one of the battery units 50 can be switched from the second state to the first state. In the case of switching only one of the battery units 50 from the second state to the first state, the second controller 24 provides each of the first controllers 56 with a designation signal that designates one of the battery units 50 in addition to the input signal S. Each of the first controllers 56 determines whether or not to switch from the second state to the first state based on the designation signal. In a case where the battery units 50 are connected to the drive unit 20, even if, for example, the charge level of one of the battery units 50 is low and the one of the battery units 50 is switched from the first state to the second state and another one of the battery units 50 is switched from the second state to the first state, electrical power is constantly supplied to the drive unit 20 via the second power supply path 82. This avoids a situation in which the second controller 24 is stopped.

In the modification shown in FIG. 9, the power line 144 can be configured to be attachable to and removable from at least one of the battery units 50 and the control unit 142.

The first controller 56 does not have to switch from the second state to the first state even in the case where the input signal S is received from the vehicle speed sensor 14D, the torque sensor 21B, and the crank rotation sensor 21A. Instead, the first controller 56 can be configured to switch from the second state to the first state in accordance with only operation of the operation device 14B.

The input voltage of the first electrical connector 34 is set to, for example 32 to 42 V. The output voltages of the first voltage converter 58, the third voltage converter 28, and the fourth voltage converter 60 are set to, for example, 8 V. The output voltages of the fourth voltage converter 60 and the fifth voltage converter 30 are set to, for example, 5 V.

The bicycle components 12 do not have to include the vehicle speed sensor 14D, and the drive unit 20 can include the vehicle speed sensor 14D. In the case where the drive unit 20 includes the vehicle speed sensor 14D, the vehicle speed sensor 14D is connected to the second controller 24 through wired or wireless communication. In this case, a signal related to the input signal S and output from a sensor provided in the drive unit 20 can include at least one of a signal output from the vehicle speed sensor 14D, a signal output from the torque sensor 21B, and a signal output from the crank rotation sensor 21A.

What is claimed is:

1. A bicycle drive unit comprising:
a motor configured to assist in propulsion of a bicycle;
a second electronic controller that directly controls the motor; and
a communication circuit configured to communicate with an operation device that operates a bicycle electric component,
the second electronic controller being operable in a third state, in which the motor is drivable, and a fourth state, in which the second electronic controller consumes less power than the third state and does not drive the motor, the fourth state consuming a non-zero amount of power, and
the second electronic controller being configured to switch an operation state from the fourth state to the third state upon the communication circuit receiving an input signal while the second electronic controller is operated in the fourth state.

2. The bicycle drive unit according to claim 1, wherein the bicycle electric component includes at least one of a shifting device, a suspension, and a seatpost.

3. The bicycle drive unit according to claim 1, wherein the second electronic controller is activated by electric power supplied from at least one of a first electric power supply path and a second electric power supply path.

4. The bicycle drive unit according to claim 3, wherein a second voltage converter is connected to the first electric power supply path to convert a voltage of power supplied through the first electric power supply path, and a third voltage converter is connected to the second electric power supply path to convert a voltage of power supplied through the second electric power supply path.

5. The bicycle drive unit according to claim 4, wherein an output voltage of the second voltage converter is substantially equal to an output voltage of the third voltage converter.

6. The bicycle drive unit according to claim 5, wherein a fifth voltage converter electrically connected to the second voltage converter and to the communication circuit, the fifth voltage converter being configured to convert the output voltage of the second voltage converter and to supply the converted output voltage to the communication circuit.

7. A bicycle drive unit comprising:
a motor configured to assist in propulsion of a bicycle;
a second electronic controller that directly controls the motor; and
a communication circuit configured to wirelessly communicate with an external device,
the second electronic controller being operable in a third state, in which the motor is drivable, and a fourth state, in which the second electronic controller consumes less power than the third state and does not drive the motor, the fourth state consuming a non-zero amount of power, and
the second electronic controller being configured to switch an operation state from the fourth state to the third state upon the communication circuit receiving an input signal while the second electronic controller is operated in the fourth state.

8. The bicycle drive unit according to claim 7, wherein the external device includes a smart phone, a tablet PC, a cycle computer, or a personal computer.

9. The bicycle drive unit according to claim 7, wherein at least one of a setting and a software of the bicycle drive unit is updated based on information transmitted by the external device.

* * * * *